United States Patent
Suzuki et al.

(10) Patent No.: US 6,411,010 B1
(45) Date of Patent: Jun. 25, 2002

(54) PIEZOELECTRIC ACTUATOR

(75) Inventors: Yoko Suzuki; Kazuo Tani; Satoshi Watanabe; Tatsuru Sato, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/569,181

(22) Filed: May 11, 2000

(30) Foreign Application Priority Data

May 17, 1999 (JP) .......................................... 11-135667

(51) Int. Cl.[7] ............................................ H01L 41/106
(52) U.S. Cl. .............. 310/323.17; 310/328; 310/323.16
(58) Field of Search ................................. 310/321, 328, 310/323.17, 323.16

(56) References Cited

U.S. PATENT DOCUMENTS

| | | | | |
|---|---|---|---|---|
| 4,742,260 A | * | 5/1988 | Shimizu et al. | 310/323 |
| 5,063,321 A | * | 11/1991 | Carter | 310/323 |
| 5,473,214 A | * | 12/1995 | Hildebrand | 310/321 |
| 6,201,339 B1 | * | 3/2001 | Tani et al. | 310/328 |
| 6,222,302 B1 | * | 4/2001 | Imada et al. | 310/321 |
| 6,223,601 B1 | * | 5/2001 | Harada et al. | 73/649 |
| 6,307,299 B1 | * | 10/2001 | Suzuki et al. | 310/312 |

FOREIGN PATENT DOCUMENTS

JP          06-277624        * 10/1994

* cited by examiner

Primary Examiner—Nestor Ramirez
Assistant Examiner—Peter Medley
(74) Attorney, Agent, or Firm—Adams & Wilks

(57) ABSTRACT

A piezoelectric actuator has a base and a movable body disposed over a surface of the base for undergoing movement relative thereto. The movable body has a frame and at least one cantilever having a first end integrally connected to the frame and a second free end. A piezoelectric element is disposed on the cantilever for undergoing expansion and contraction movement in response to application of an alternating voltage to bring the second free end of the cantilever into and out of contact with the surface of the base to thereby move the movable body relative to the surface of the base. Spring members are connected to the frame of the movable body for regulating a direction of movement of the movable body relative to the surface of the base.

25 Claims, 5 Drawing Sheets

PIEZOELECTRIC ACTUATOR

BACKGROUND OF THE INVENTION

1. Field of the Invention

The present invention relates to a piezoelectric actuator in which at least one-directional movement of a moving body is facilitated, and which can insure high movement conversion efficiency even when miniaturized.

2. Background Information

FIG. 7 is a perspective drawing showing an example of a piezoelectric actuator of the related art. This piezoelectric actuator 300 is used as an XY stage for movement over a microscopic distance, and movement in each axial direction is realized by stacked piezoelectric elements. A metal plate is punched by wire discharge or die processing on an anchor block and a movable table 303 is placed inside the punched out part 302. Respective support springs 304 are formed on the four edges of the movable table 303 and guide sections 305 are attached to the four edges of the movable table 303 through the support springs 304. Also, stacked piezoelectric elements 306 are attached to ends of the guide sections at right angles to the movable table 306.

An enlarged plan view of a support spring 304 is shown in FIG. 8. This support spring 304 is formed as a rectangular frame, and a long edge 304a is thin while a short edge 304b is thick. This is because by making the long edge 304a long and thin, stress for a given amount of displacement is lowered exponentially or linearly so that the structure of the movable table 303 connected through the support springs 304 has a degree of freedom with respect to movement in an X axis direction in the drawings, which is the width direction of the long edge 304a. As shown in FIG. 9, in the case where the width of the support spring is a and the thickness is b, an aspect ratio (b/a) is set to at least 1 and twisting displacement is suppressed when the movable table 303 is moved.

When this piezoelectric actuator 300 is moved in the X axis direction, a fixed voltage is applied to the stacked piezoelectric elements 306a for X direction movement to cause displacement. If the stacked piezoelectric elements 306a are displaced in the thickness direction, the movable table 303 connected by the guide sections 305a is joined and moves in the X direction. At this time, support springs 304 formed on the X direction edges move in the direction of the short edge. Also, X direction guide sections 305a function to guide the movable table 303 in the X direction. On the other hand, support springs 304 formed on the Y direction edges have difficulty moving in the direction of the long edge and so it is difficult to absorb displacement of the stacked piezoelectric elements 306a. The same also applies to movement in the Y direction.

However, with the above described piezoelectric actuator 300 of the related art, since stacked piezoelectric elements 306 are generally used it is necessary to first of all form the stacked piezoelectric elements 306 so as to satisfy relevant standards. The stacked piezoelectric elements 306 are generally manufactured using a green sheet method employing a green sheet made from a piezoelectric slurry. After conductive paste for internal electrodes has been screen printed on green sheets, a specified number of the green sheets are laminated and baked. Characteristics of a stacked piezoelectric element formed in this way are that strong generated force is obtained, but displacement is microscopic. The thus formed stacked piezoelectric element is fitted between a guide section 305 and a fixed table 301, and joining and complicated adjustment steps are necessary. This means that the manufacture of the XY stage for movement and the piezoelectric actuator 300 are difficult and complicated, and with increased amount of movement of the movable table 303 it is necessary to provide support points between the guide sections 305 and the fixed table 301 and to provided an enlarged cantilever. As a result, a correspondingly complicated structure results from further structural miniaturization.

SUMMARY OF THE INVENTION

The present invention has been conceived in view of the above described problems in the related art, and its object is to provide a novel approach to the problems.

In order to achieve this object, a piezoelectric actuator of a first aspect of the present invention comprises a base, a flat moving body constituting a cantilever with one end free and another end fixed and provided with piezoelectric elements, and support springs for supporting the moving body so as to track a surface of the base and for regulating direction of movement of the moving body.

If a alternating voltage is applied to the piezoelectric elements provided on the flat cantilever, the cantilever bends with oscillation and a free end of the cantilever comes into contact with the base. The free end of the cantilever undergoes elliptical motion which means that a sideways direction component excites movement of the moving body. Also, the contact state between the moving body and the base is kept stable by the support springs and the moving direction of the moving body is limited by the structure of the support springs, which means that motion and positioning of the moving body can be carried out easily.

A piezoelectric actuator of a second aspect of the present invention comprises a base, a flat moving body comprising a long-edged portion on which piezoelectric elements are provided and a short-edged section, and constituting a cantilever having the long-edged section free and the short-edged section fixed, and support springs for supporting the moving body so as to track a surface of the base and for regulating direction of move; of the moving body.

If the cantilever is formed having a long-edged section and a short-edged section, twisting vibration is excited at the same time as the cantilever bends with oscillation. As a result, the amplitude of oscillation at the free end becomes large and it is easy to obtain a larger motion of the moving body compared to the first piezoelectric actuator structure described above.

A third aspect of the present invention is the piezoelectric actuator of either the first or second aspects in which pressurization means is provided for causing the base and the moving body to be pressed into contact with each other. By pressing the moving body and the base with the pressurization means, not only is following further improved, and the state of contact with the cantilever made good, but also motion and locating of the moving body are made more stable.

DETAILED DESCRIPTION OF THE PREFERRED EMBODIMENTS

The present invention will now be described in detail with reference to the attached drawing. It is to be understood, however, that the present invention is not limited to these described embodiments.

Figure 1:
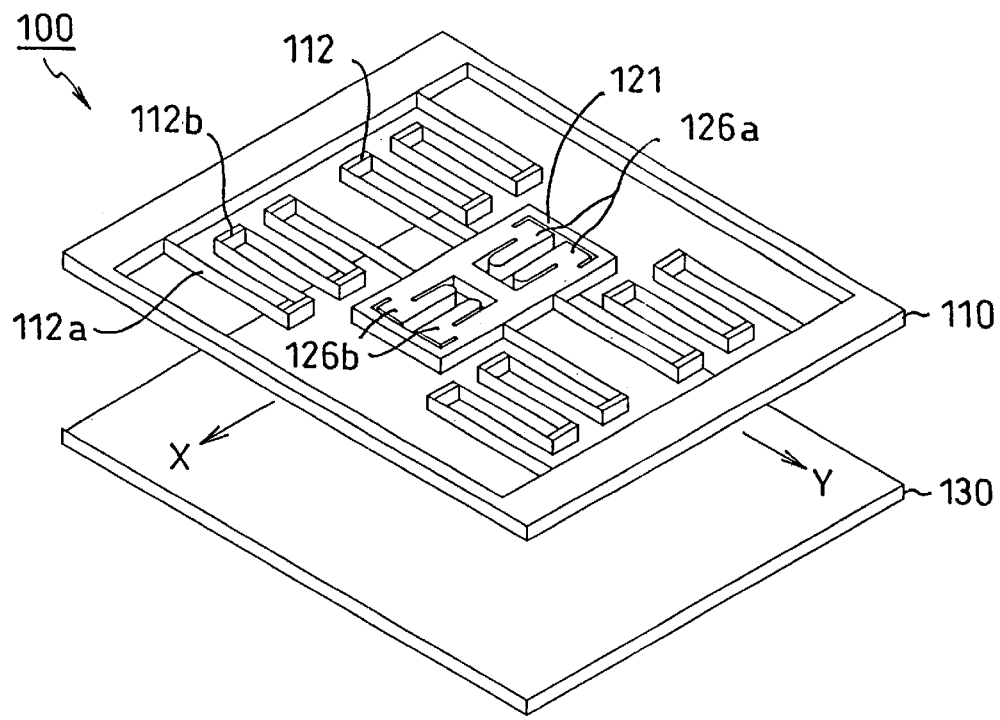
FIG. 1 is an assembly drawing showing a piezoelectric actuator relating to a first embodiment of the present invention.

FIG. 1 is an assembly drawing showing a piezoelectric actuator relating to a first embodiment of the present invention. This piezoelectric actuator 100 comprises a movable plate member 110 (hereinafter "movable plate") having a movable body or moving body 121, and a base 130. The movable plate 110 is configured having the moving body 121 provided a frame 121a and four cantilevers 126a, 126b (hereinafter "cantilever 126") connected to the frame which is supported to the movable plate 110 by four support biasing members or springs 112. The support springs 112 are formed having a zigzag snaking shape, with a long-edged section 112a being thin, and a short-edged section 112b being thick, and such that it is possible to increase a distance between the moving body 121 and an external frame section of the movable plate 110 connected to the support springs 112. Also, the thickness of the support springs 112 is such that with respect to the long-edged section 112a, an aspect ratio (thickness/width) is at least 1. The support spring 112 structure enables easy bending deformation in the X axis direction, while deformation in the Y and Z axis directions is difficult, and twisting deformation is easy. At the same time as the moving body 121 supported on the support springs 112 has horizontal movement restructured to only the X axis direction, it is possible to cause vibration around the X axis and the Y axis. With the support spring 112 structure, the contact state between the base 130 and the moving body 121 can always be kept constant. The shape of the support springs 112 is not limited to the snaking shape shown in the drawings, and they can be any shape as long as it is easy to move the moving body 121.

Stainless steel or aluminum material can be used for the movable plate 110. It is also possible to use a metallic or non metallic elastic material such as beryllium copper, phosphor bronze, brass, duralumin, titanium or silicon. The movable plate 110 is preferably made using photolithography techniques. By using a non-mechanical manufacturing process, it is possible to eliminate deformation, stress and mechanical stress arising at the time of manufacture, which together are beneficial to mass production. Also, due to high precision of the components, it is possible to reduce assembly and adjustment processes for each of the constituent elements as much as possible, and this makes the function and reproducibility stable. The aspect ratio of the support springs 112 is at least one, but negative tone near ultra violet resist technology can also be employed to make the support springs 112.

A sliding surface (omitted from the drawings) is preferably provided at a section of the base 130 contacting a lower surface of the moving body 121. A material satisfying various conditions, such as a large frictional coefficient, excellent abrasion resistance, ability to maintain a stable frictional coefficient, etc. is preferably used on the sliding surface. For example, it is possible to make the sliding surface by carrying out oxidation film treatment. It is also possible for the sliding surface to use cellulose fiber, carbon fiber, a jointing material for whiskers and phenol resin, or a jointing material for polyimide resin and polyamide resin.

Figure 2:
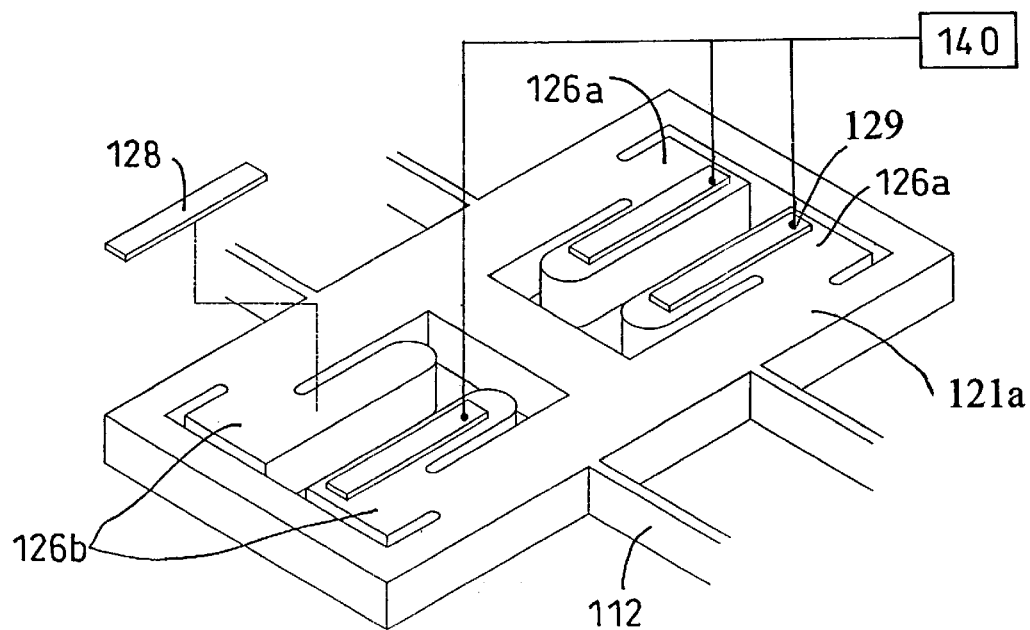
FIG. 2 is an enlarged explanatory drawing showing a moving body shown in FIG. 1.

FIG. 2 is an enlarged drawing of the moving body 121 shown in FIG. 1. The cantilever 126 shown here has a long-edged section and a short-edged section, with the long-edged section joined to the piezoelectric element 128 being a free end and the short-edged section connected to the moving body being a fixed end. The piezoelectric element 128 is also subjected to polarization processing in a specified direction. The piezoelectric element 128 is formed of a piezoelectric material, piezoelectric material being a material simultaneously provided with a strain generating function, a resonance function and a voltage generating function. Specifically, piezoelectric material is a material that exhibits displacement without stress in response to an applied voltage, causes a resonance phenomenon with the frequency of the applied voltage, and generates a voltage in response to applied force. A zircon lead titanate thin-film having high piezoelectric constant is used in the piezoelectric element 128 in this embodiment. It is also possible to use barium titanate, lithium niobate or zircon lead titanate. It is also possible to use an inclined function material or lithium niobate instead of the piezoelectric ceramics. A driver 140 for applying a alternating voltage is connected to electrodes 129 of the piezoelectric element, and the driver 140 controls behavior of the moving body by varying the frequency or voltage, or both the frequency and voltage, of the applied voltage. The number of cantilevers is not limited to four and can be determined according to the required driving force.

The cantilevers 126 are joined to the piezoelectric element 128 by adhesive. Conditions to be satisfied by the adhesive are that it is an extremely thin adhesive layer, that the adhesive layer is hard and tough, and that a resistance value in the vicinity of the resonant frequency is small after fastening the cantilevers 126 and the piezoelectric element 128. A joining interface exists between the cantilevers 126 and the piezoelectric element 128 even if joined by direct joining or adhesive. This joining interface is a significant factor in determining propagation characteristics between the cantilevers 126 and the piezoelectric element 128. Because of this, the characteristics of the adhesive or control of the film thickness of the adhesive is important. For example, polymer adhesive such as hot melt or epoxy resin is used as the adhesive. In this embodiment, epoxy type adhesive is used to obtain an optimum film thickness. It is also possible for the cantilevers 126 to directly make contact with the piezoelectric element 128 without using adhesive, and to provide a piezoelectric element using thin film formation and pressure membrane formation processing means.

It is possible to use either a unimorph type having a single plate, a bimorph type having two plates, or a multimorph type having four or more plates as the piezoelectric element. The material and method of fastening the piezoelectric element 128 and the cantilevers 126 is determined according to the amount of displacement, force, responsivity and structural limitations of the cantilevers required by the piezoelectric actuator. A unimorph structure is adopted for the cantilevers 126 of this embodiment, because it is difficult to cause hysterisis with respect to the displacement voltage characteristic in a unimorph structure. Furthermore, compared to a bimorph structure, the amount of displacement is small but the force generated force, and the load and applied force of the moving body are appropriate. It is possible to adopt a multimorph type structure and to increase the displacement and force by increasing the number of layers while maintaining a constant thickness, depending on the specifications of the piezoelectric element. With the moving body 121 having such a structure, bending and twisting displacement of the cantilevers 126 can be excited in an extremely stable manner.

The base 130 can be made using a similar material and method as for the movable plate 110. It is also possible to use an inner surface of an equipment case as the base, without the need for a special component.

Figure 3:
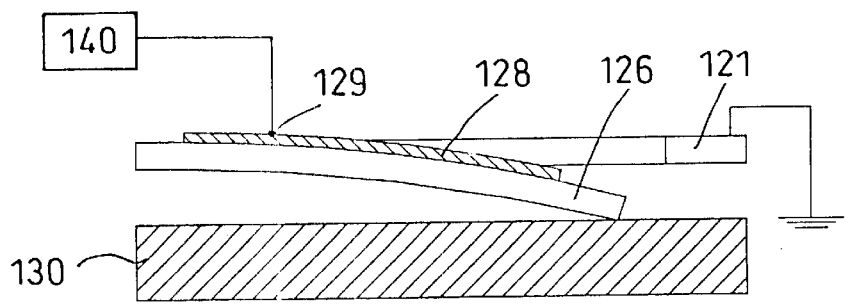
FIG. 3 is an explanatory drawing showing a driving principle for the piezoelectric actuator of the present invention.

The principal of operation of the piezoelectric actuator 100 will now be described. FIG. 3 is an explanatory drawing showing the driving principal of the piezoelectric actuator of the present invention. If a positive or negative voltage is applied to an electrode 129, the piezoelectric element 128 becomes elongated and the free ends of the cantilevers 126 bend towards the base 130. If the voltage is then removed, the piezoelectric element 128 and the cantilevers 126 return to their original shape. The cantilevers 126 bend in accordance with displacement of the piezoelectric element 128 and the tips of the free ends of the cantilevers 126 generate elliptical motion and come into contact with the base 130. As a result, force of a horizontal component (in a right to left direction in the drawing) of the tips of the free ends is transmitted by means of frictional force, and the moving body 121 is made to move a microscopic amount in the opposite direction (from left to right in the drawing). Accordingly, this microscopic movement is repeated by cyclically applying voltage to the piezoelectric element 128 and so it is possible to cause the moving body 121 to move continuously. In FIG. 3, contacting sections of the cantilevers 126 and the base 130 are shown as flat surfaces, but it is not necessary for the contacting sections to come in contact with each other in a flat manner, and point contact can also be made.

Next, operation of the piezoelectric actuator 100 will be described. If a alternating voltage is applied to the piezoelectric element 128 of a cantilever 126a facing in one direction because of the above described principal, the moving body 121 moves in a fixed direction (the X direction). Because the moving body 121 is supported by the support springs 112, the support springs 112 bend in accordance with movement of the moving body 121. Also, since the moving body 121 has a structure where direction of movement is regulated by the structure of the support springs 112 and is aligned with a direction of the free ends of the support springs 112 where the support springs 112 have a high degree of freedom, it is possible to reliably move the moving body 121 linearly as required. Also, if a alternating voltage is applied to the piezoelectric element 128 of a cantilever 126b facing in the opposite direction, the moving body will move in the opposite direction.

With respect to stable movement of the moving body 121, it is necessary for opposite surfaces of the moving body 121 and the base 130 to maintain uniform contact. Since the moving body 121 is supported extremely flexibly in the X direction, it is possible to follow the surface of the moving body vibrating subtly around the X and Y axes. As a result, it is possible to control movement of the moving body in a stable manner.

Figure 4A:
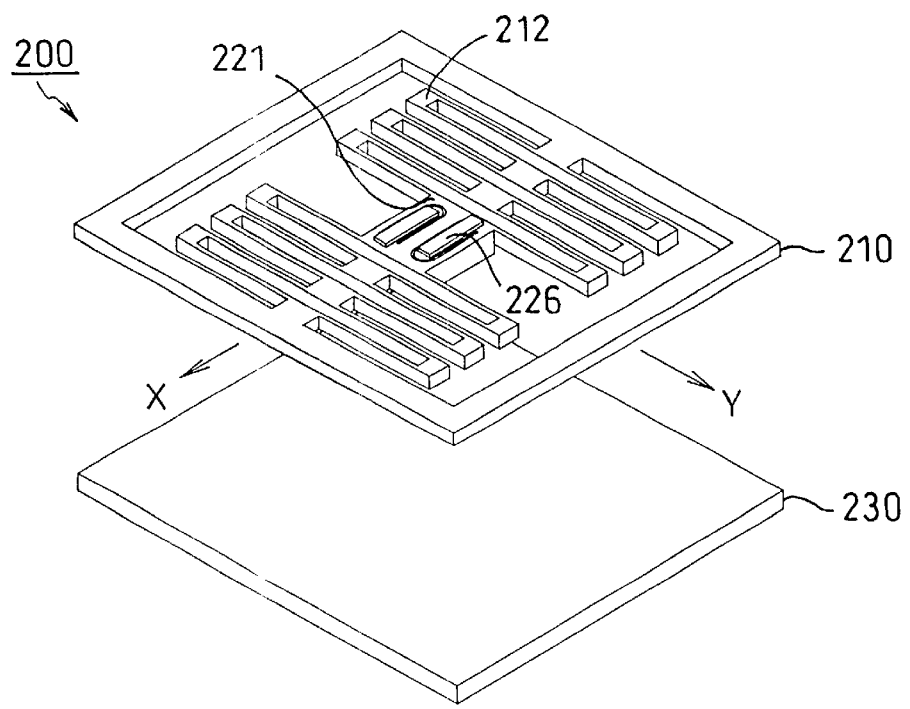
FIG. 4A is an assembly drawing of a piezoelectric actuator relating to a second embodiment of the present invention.

A second embodiment of the present invention will now be described. FIG. 4A is an assembly drawing showing a piezoelectric actuator of the second embodiment of the present invention. The piezoelectric actuator 200 has a structure that enables pressurization of the moving body 221, and comprises a movable plate 210 containing a moving body and a base 230.

The moving plate 210 has the moving body 221 formed in the middle and has a structure such that the moving body 221 is fixedly supported with a degree of freedom in the X direction by support springs 212. The support springs 212 are a rectangular frame shape consecutively connected at centers of a long-edged section. These support springs 212 have a width of the rectangular frame small and a thickness large, enabling movement of the moving body 221 in only the X axis direction, and also enabling twisting deformation following undulation of the base surface. A cantilever 226 having one end free and the other end fixed is arranged in the moving body 221, and the moving body 221 is driven. The driving principal is the same as for the first embodiment.

Figure 4B:
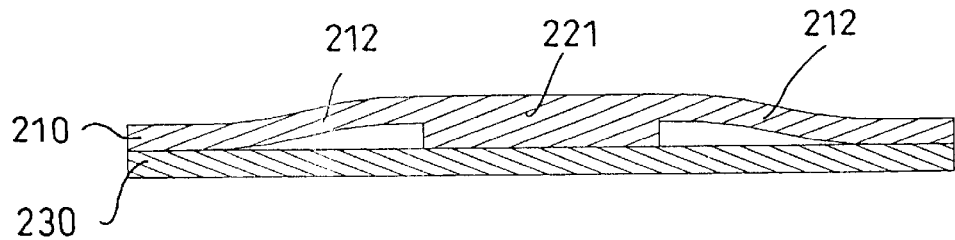
FIG. 4B is a cross-sectional drawing of a piezoelectric actuator relating to a second embodiment of the present invention.

A cross-section of the structure of pressurizing the moving body is shown in FIG. 4(b). As a structure for generating preload, the moving body 221 is formed so that the movable plate 210 is thick towards the base 130 compared to the support springs 212. The piezoelectric actuator 200 is assembled by gluing an outer frame of the movable plate 210 and the base 130 together. Because of the thickness of the moving body 221 at this time, the support springs 212 are deformed in a thickness direction (opposite to the base 230) at the same time as a sliding surface of the moving body 221 definitely comes into contact with a surface of the base 230, which means that a constant contact pressure is always exerted on the moving body 221. By adjusting the thickness of the moving body, it is possible to optimally control contact pressure and to provide a moving body 221 having high efficiency and precision.

Figure 5A:
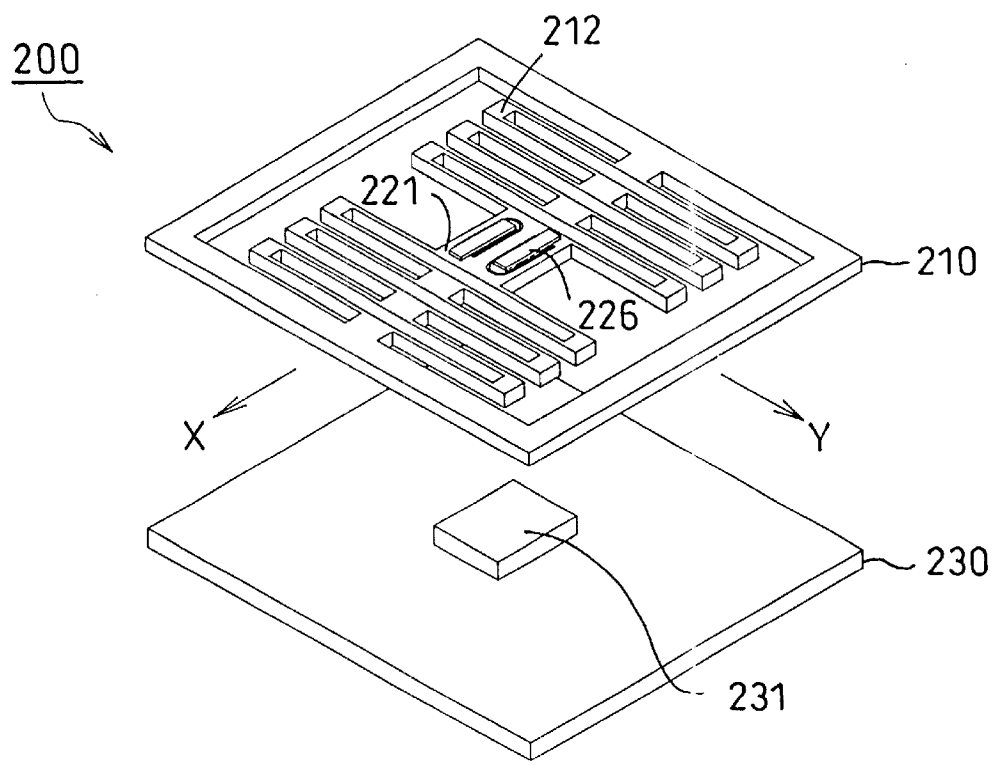
FIG. 5A is an assembly drawing of a modified example of a piezoelectric actuator relating to a second embodiment of the present invention.
Figure 5B:
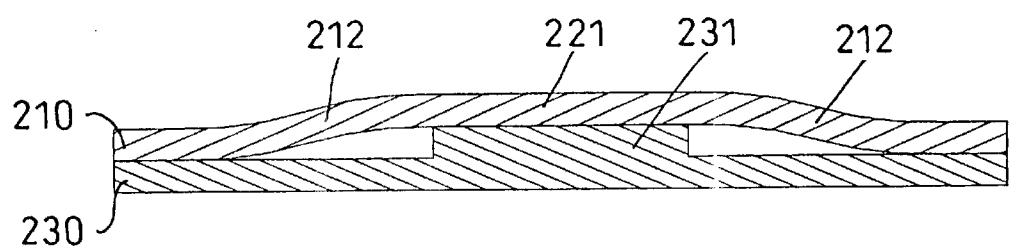
FIG. 5B is a cross sectional drawing of a modified example of a piezoelectric actuator relating to a second embodiment of the present invention.

The structure of generating preload is not limited to that described above. As shown in FIGS. 5A, 5B, a similar function can be obtained by forming a protrusion 231 in the base 230 to come into contact with the moving body 221.

Figure 6:
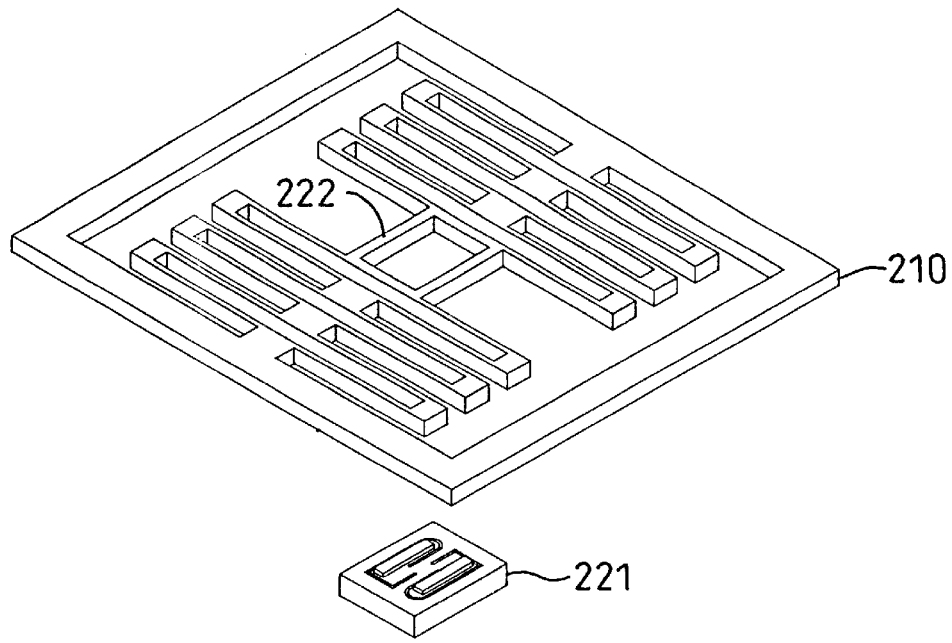
FIG. 6 is an explanatory drawing showing a piezoelectric actuator according to the second embodiment of the present invention.
Figure 7:
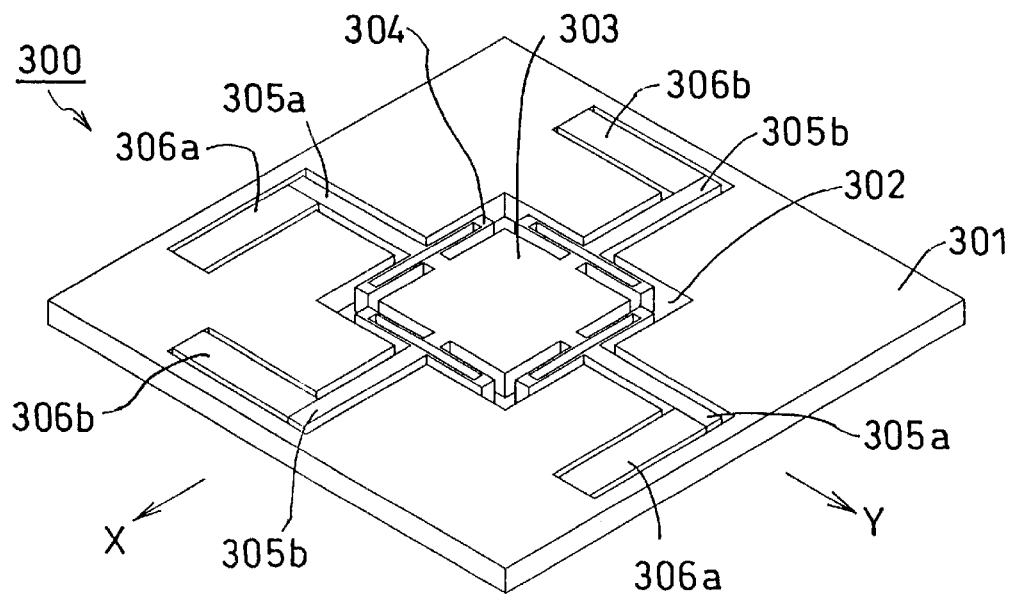
FIG. 7 is a perspective view showing an example of a conventional piezoelectric actuator.
Figure 8:
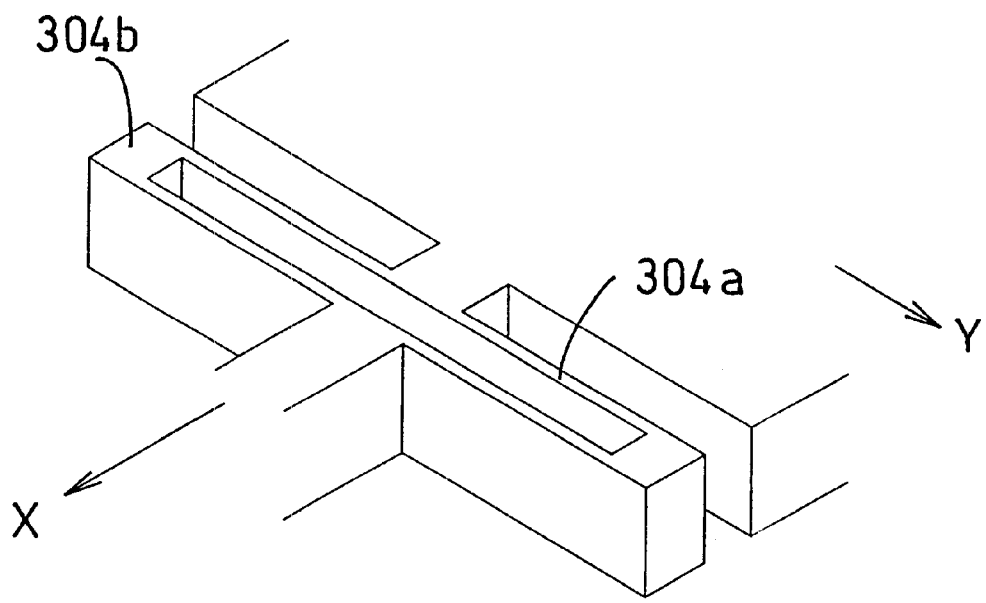
FIG. 8 is an explanatory drawing showing a support spring of a conventional piezoelectric actuator.
Figure 9:
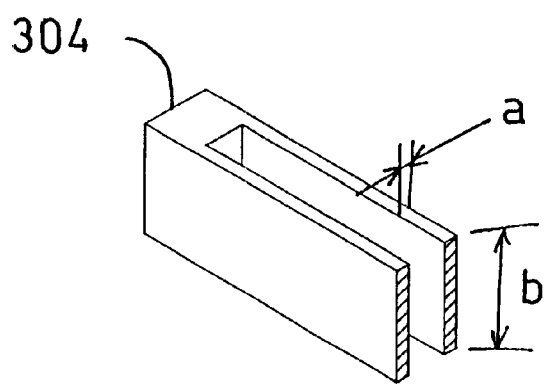
FIG. 9 is an enlarged view showing a support spring of a conventional piezoelectric actuator.

This movable plate 210 can be formed of the same material and using the same methods as for the above described first embodiment. As a method of forming the moving body 221 in a protruding shape, there is a method of forming the movable plate 210 at a uniform thickness and then making parts other than the moving body 221 thinner by etching etc., or there is a method of adhering or joining the movable plate 210 having a joining section 222 and support springs 212 and the moving body 221 together after they have been individually processed (FIG. 6). Similarly, also in the case where there is a protruding section 231 on the base 230, a method of adhering or joining only the protruding section 231 to the base 230 after it has been formed, or a method of forming the protruding section 231 and the base 230 together can be adopted.

Although not shown in the drawings, as an example of modification to the above described first and second embodiments, it is possible to provide the cantilevers 126 or 226 in two sizes. With this structure, coarse control can be carried out by the large cantilevers and fine control can be carried out by the small cantilevers.

As has been described above, with the piezoelectric actuator of the present invention, since piezoelectric elements are provided on flat plate-like cantilevers, it is possible to carry out machining processes and easily provide a high precision shape. At the same time, with respect to mass production, since the number of components is reduced it is easy to reduce the cost with large volume production. It is possible to realize support spring shape and movement distance of the moving body according to desired specifications for functions. Also, since the moving body faces and follows the base, it is possible to control movement in a stable manner.

According to the second embodiment of the present invention, by having the cantilevers comprising a long-edged section and a short-edged section, it is possible to obtain a large amplitude of vibration at the tips of free ends and operation of the moving body is improved. Also, since machining processes can be carried out, high precision shapes can be formed together and it is easy to reduce the cost for large scale production because the number of components is reduced.

The piezoelectric actuator of the present invention having the pressurization means enables high precision batch production and makes it possible to easily reduce costs with mass production, and at the same time since the pressurization means for causing pressurized contact between the moving body and the base is provided it is possible to improve locating precision and efficiency and to perform movement control in a stable manner.

What is claimed is:

1. A piezoelectric actuator comprising:
   a base;
   a movable body disposed over a surface of the base for undergoing movement relative thereto, the movable body having a frame and at least one cantilever having a first end integrally connected to the frame and a second free end;
   a piezoelectric element disposed on the cantilever for undergoing expansion and contraction movement in response to application of an alternating voltage to bring the second free end of the cantilever into and out of contact with the surface of the base to thereby move the movable body relative to the surface of the base; and
   a plurality of spring members connected to the frame of the movable body for regulating a direction of movement of the movable body relative to the surface of the base.

2. A piezoelectric actuator according to claim 1; further comprising pressurization means for pressing the frame of the movable body and the surface of the base into contact with each other.

3. A piezoelectric actuator according to claim 2; wherein the pressurization means comprises a protrusion extending from the surface of the base for contacting the movable body.

4. A piezoelectric actuator according to claim 2; wherein the pressurization means comprises a portion of the frame of the movable body for contacting the surface of the base.

5. A piezoelectric actuator according to claim 1; wherein the cantilever has a first section connected to the frame and a second section having a length greater than and connected to the first section, the second section having the second free end.

6. A piezoelectric actuator according to claim 5; further comprising pressurization means for pressing the frame of the movable body and the surface of the base into contact with each other.

7. A piezoelectric actuator according to claim 1; wherein the cantilever has a generally flat first major surface on which the piezoelectric element is disposed and a generally flat second major surface opposite the first major surface and confronting the surface of the base.

8. A piezoelectric actuator according to claim 1; further comprising a plate member supporting the movable body and the spring members.

9. A piezoelectric actuator according to claim 8; wherein each of the spring members has a first end connected to the plate member and a second end connected to the frame of the movable body.

10. A piezoelectric actuator according to claim 1; wherein the frame of the movable body has first side surface and a second side surface opposite the first side surface; and wherein the plurality of spring members comprise a first group of spring members connected to the first side surface of the frame and a second group of spring members connected to the second side surface of the frame.

11. A piezoelectric actuator comprising: a base; a movable body disposed over a surface of the base for undergoing movement relative thereto, the movable body having a frame and a plurality of cantilevers each having a first end integrally connected to the frame and a second free end; a plurality of piezoelectric elements each disposed on a respective one of the cantilevers for undergoing expansion and contraction movement in response to application of an alternating voltage to bring each of the second free ends of the cantilevers into and out of contact with the surface of the base to thereby move the movable body relative to the surface of the base; and a plurality of spring members connected to the frame of the movable body for regulating a direction of movement of the movable body relative to the surface of the base.

12. A piezoelectric actuator according to claim 11; wherein each of the cantilevers has a first section connected to the frame and a second section having a length greater than and connected to the first section, the second section having the second free end.

13. A piezoelectric actuator according to claim 11; further comprising pressurization means for pressing the frame of the movable body and the surface of the base into contact with each other.

14. A piezoelectric actuator according to claim 13; where in the pressurization means comprises a protrusion extending from the surface of the base for contacting the movable body.

15. A piezoelectric actuator according to claim 13; wherein the pressurization means comprises a portion of the frame of the movable body for contacting the surface of the base.

16. A piezoelectric actuator according to claim 11; wherein each of the cantilevers has a generally flat first major surface on which a respective one of the piezoelectric elements is disposed and a generally flat second major surface opposite the first major surface and confronting the surface of the base.

17. A piezoelectric actuator according to claim 11; further comprising a plate member supporting the movable body and the spring members.

18. A piezoelectric actuator according to claim 17; wherein each of the spring members has a first end connected to the plate member and a second end connected to the frame of the movable body.

19. A piezoelectric actuator according to claim 11; wherein the frame of the movable body has a first side surface and a second side surface opposite the first side surface; and wherein the plurality of spring members comprise a first group of spring members connected to the first side surface of the frame and a second group of spring members connected to the second side surface of the frame.

20. A piezoelectric actuator comprising: a base; a movable body disposed over a surface of the base for undergoing movement relative thereto, the movable body having a frame and at least one cantilever having a first end integrally connected to the frame and a second free end; a piezoelectric element disposed on the cantilever for undergoing expansion and contraction movement in response to application of an alternating voltage to bend the cantilever and cause a tip portion of the free end of the cantilever to undergo elliptical movement in first direction and to contact the surface of the base to thereby move the movable body relative to the surface of the base in a second direction opposite to the first direction; and biasing means for regulating movement of the movable body relative to the surface of the base in the second direction.

21. A piezoelectric actuator according to claim 20; wherein the biasing means includes means for regulating movement of the movable body so that the movable body undergoes linear movement in the second direction.

22. A piezoelectric actuator according to claim 20; wherein the biasing means comprises a plurality of spring members connected to the frame of the movable body.

23. A piezoelectric actuator according to claim 22; further comprising a plate member supporting the movable body and the spring members.

24. A piezoelectric actuator according to claim 23; wherein each of the spring members has a first end connected to the plate member and a second end connected to the frame of the movable body.

25. A piezoelectric actuator according to claim 22; wherein the frame of the movable body has a first side surface and a second side surface opposite the first side surface; and wherein the plurality of spring members comprise a first group of spring members connected to the first side surface of the frame and a second group of spring members connected to the second side surface of the frame.

* * * * *